3,046,315
PROCESS FOR ALKYLATING AN AROMATIC
HYDROCARBON WITH AN OLEFIN
Harold L. Dimond, Pittsburgh, Pa., assignor to Gulf Research & Development Company, Pittsburgh, Pa., a corporation of Delaware
No Drawing. Filed Mar. 18, 1960, Ser. No. 15,846
4 Claims. (Cl. 260—671)

This invention relates to a process for preparing an alkyl aromatic.

Alkyl aromatics are prepared in accordance with the process of this invention by reacting an alkylatable aromatic compound with an olefin in the presence of a catalyst comprising essentially boron trifluoride and water. Operation in accordance with such process results in conversion of said alkylatable aromatic compound substantially completely to an alkyl aromatic hydrocarbon having one more alkyl group than the reactant aromatic hydrocarbon. Polymerization of olefin during the process is negligible.

Any alkylatable aromatic hydrocarbon can be employed in the reaction, whether it be solid or liquid, mononuclear, dinuclear or polynuclear, substituted or unsubstituted. Among the mononuclear aromatic hydrocarbons which are preferred are benzene and substituted benzenes containing as substituents from one to three alkyl radicals, each of said alkyl radicals having from one to 20 carbon atoms, preferably from one to 10 carbon atoms. Among the dinuclear alkylatable aromatic hydrocarbons which are preferred are naphthalene and substituted naphthalenes containing as substituents from one to four alkyl radicals, each of said alkyl radicals having from one to 20 carbon atoms, preferably from one to 10 carbon atoms. Examples of alkylatable aromatic compounds which can be employed are benzene, toluene, ethylbenzene, xylenes, tetralin, cumene, diisopropylbenzenes, n-octylbenzene, 2-phenyl-4-ethyloctadecane, naphthalene, isopropylnaphthalenes, diisopropylnaphthalenes, 1-ethyl-6-isobutylnaphthalene, 1,2,4-triisopropylbenzene, phenanthrene, etc. In the event the alkylatable aromatic compound is normally liquid, no extraneous solvent need be employed in the reaction. With a normally solid alkylatable aromatic hydrocarbon an inert solvent such as heptane, octane, isooctane, hexane, etc., can be employed.

While olefins having from three and up to 30 carbon atoms can be employed in the alkylation reaction olefins having from three to 20 carbon atoms are preferred. Examples of olefins which can be employed are propylene, isobutylene, butene-1, cis-butene-2, trans-butene-2, pentene-1, cyclopentene, cyclohexene, cycloheptene, 4-methylcyclooctene, 2-methylbutene-1, 2-methylbutene-2, 3-methyl-butene-1, cis-pentene-2, trans-pentene-2, hexene-1, cis-hexene-2, trans-hexene-2, 5,6-dimethylheptene-1, tetrapropylene, pentadecene-1, 6-cyclohexyldodecene-1, 4-n-nonyldodecene-1, n-tetracosene-1, n-heptacosene-1, 13-cyclopentylpentacosene, etc. Neither the alkylatable aromatic compound nor the olefin need be pure but can be present in admixture with other materials which are substantially inert under the reaction conditions.

The amount of olefin which need be present at any moment can of course be very small. Thus in cases wherein the olefin, for example propylene, is introduced continuously into the mixture of alkylatable aromatic compound, for example benzene, and catalyst, the amount of olefin initially present is extremely small. In the event large amounts of reactants and catalyst are brought together at once the amount of olefin present initially will of course be large. In such case the molar ratio of olefin relative to the alkylatable aromatic must not be in excess of about 0.81:0. In no event, for reasons which will be set forth in greater detail hereinafter, however, must the total amount of olefin which is used during the reaction be greater than about 0.8 mol per mol of alkylatable aromatic compound, preferably no more than about 0.7 mol per mol of alkylatable aromatic compound.

The catalyst which is employed in the process of this invention can be defined by the following formula: $BF_3 \cdot nH_2O$ wherein $n$ has a value of about 0.5 to about 2.5, preferably about 1.2 to about 1.6, most preferably about 1.6. The catalyst can be prepared in many ways but preferably is prepared by bubbling gaseous boron trifluoride into water until the concentration defined above is obtained. During the preparation of the catalyst according to such procedure the temperature should be held within a temperature range of about 0° to about 50° C., preferably within a range of about 10° to about 20° C. While no allegations are made herein as to the physical and/or chemical relationship of the boron trifluoride and water in the above formula, any catalyst encompassed by the above formula can be employed. The amount of catalyst used corresponds to about 0.5 to about 180 percent by weight relative to the amount of alkylatable aromatic compound initially present. To regenerate the catalyst additional boron trifluoride can be bubbled through the same under the temperature conditions noted above until the catalyst falls within the above formula.

The reaction conditions are not critical and fall within the scope of conditions normally employed in such reactions. Thus the temperature can be from about −20° to about 80° C., the pressure from about 0 to about 600 pounds per square inch gauge and the residence time about 0.1 to about 10 hours.

Upon completion of the reaction two phases are observed, an upper organic layer and a lower catalyst layer. The two layers can be separated by any convenient method, preferably by decantation. The organic layer can thereafter be washed with an aqueous solution to remove catalyst or other water-soluble compounds therefrom and subsequently dried in any convenient method, for example by contacting the same with sodium hydroxide pellets. The remainder of the organic layer can thereafter be separated into its individual components by distillation or any other suitable means.

The most important feature of the present invention resides in the fact that substantially all of the alkylatable aromatic compound which is converted is converted to an alkyl aromatic hydrocarbon having but one more alkyl group than the reactant aromatic hydrocarbon. It is critical in the practice of this invention in order to obtain such desired result that the alkylation reaction be terminated when the amount of reactant alkylatable aromatic compound in the reaction mixture, exclusive of catalyst, amounts to at least about 17 percent, preferably at least about 20 percent, by volume of said reaction mixture.

The invention can further be illustrated by reference to the following examples. Example I below illustrates the critical aspects of the process of this invention as described in the paragraph immediately above.

EXAMPLE I

Into a flask there was placed 365 grams of benzene and 658.4 grams of catalyst corresponding to the following formula $BF_3 \cdot 1.6H_2O$. Propylene was continuously added to this mixture at the rate of about 270 to 275 (STP) cc. per minute over a period of 1¾ hours or until 1.27 mols of propylene had been added. Throughout the reaction the mixture was stirred constantly, the temperature was maintained at 45° C., and the pressure was one atmosphere. At the end of this time the contents of the flask were withdrawn therefrom at a rate which varied from 15 to 25 cc. per minute. At the same time the rate of propylene introduction was maintained and benzene at the rate of 12.5 cc. per each 15 minutes was continuously introduced therein. This was continued for an additional 13 hours. Samples were periodically taken of the contents withdrawn from the flask. The catalyst associated therewith was in each instance decanted therefrom and returned to the system. Each sample, amounting to 700 grams, was washed with 100 cc. of water to remove traces of catalyst associated with the organic material and subsequently contacted with sodium hydroxide pellets to remove water therefrom. The remainder of the organic layer was subjected to infrared analysis to identify the individual components present. The results are tabulated below in Table I.

*Table I*

| Sample No. | Concentration in Percent by Volume | | | | |
|---|---|---|---|---|---|
| | Benzene | Cumene | Diisopropyl Benzenes | | |
| | | | p- | m- | o- |
| 1 | 39.1 | 59.7 | 0.8 | 0.3 | 0.0 |
| 2 | 26.1 | 70.8 | 1.3 | 1.7 | 0.0 |
| 3 | 17.8 | 77.5 | 2.1 | 2.6 | 0.0 |
| 4 | 15.0 | 77.2 | 3.5 | 3.4 | 0.9 |
| 5 | 11.7 | 77.8 | 5.1 | 4.3 | 1.1 |
| 6 | 8.2 | 76.9 | 7.4 | 6.2 | 1.3 |
| 7 | 7.0 | 72.2 | 9.7 | 5.2 | 5.9 |

The advantages of operating in accordance with the present process are apparent from an inspection of the above data. Note that in sample No. 1 the amount of unreacted benzene in the organic product was 39.1 percent and that the total amount of diisopropyl benzenes amounted only to 1.1 percent. No ortho diisopropyl benzene was found. This indicates the reaction is proceeding substantially completely in the direction of formation of cumene, for with the formation of ortho diisopropyl benzene, large and significant amounts of the remaining diisopropyl benzenes will also be formed. In sample No. 2 wherein the unreacted benzene amounted to 26.1 percent, the total amounts of diisopropyl benzenes came to only 3.0 percent and no ortho diisopropyl benzene was found. Although in sample No. 3 the total amount of diisopropyl benzenes was increased to 4.7 percent, no ortho diisopropyl benzene was found and an appreciable increase in the amount of cumene over sample No. 2 was obtained. By the time the amount of unreacted benzene was reduced to 15.0 percent, as seen in sample No. 4, large amounts of diisopropyl benzenes, including ortho diisopropyl benzene, had formed and no further increase in the amount of cumene over sample No. 3 was found.

From Table I it can be observed that the process can be terminated as soon as a measurable quantity of ortho diisopropyl benzene is formed. The small quantities of para and meta diisopropyl benzenes which have formed prior to the formation of ortho diisopropyl benzene are easily separable by distillation from each other and from the reaction mixture. Ortho diisopropyl benzene, on the other hand, is very difficult to separate from the meta diisopropyl benzene which is present. For such reason also it is sought to minimize the formation of ortho diisopropyl benzene.

Although I am not certain why the formation of polyalkylated aromatic hydrocarbons is inhibited when the alkylation process is carried out in the manner described herein, it is apparent from Example II below that the reactant alkylatable aromatic hydrocarbon does not serve as a diluent therefor.

EXAMPLE II

Into a flask there was placed 651 grams of catalyst having the same composition as that employed in Example I, 234.3 grams of benzene and 98.7 grams of cyclohexane. The cyclohexane was employed as diluent to replace some of the benzene in the final reaction mixture. Under the same reaction conditions as in Example I propylene was continuously introduced into the flask at the rate of about 270 to 275 cc. per minute over a period of 3.4 hours. Catalyst removal and hydrocarbon work-up were the same as in Example I. The resulting hydrocarbon layer analyzed as follows in percent by weight: 8.3 benzene, 16.7 cyclohexane, 68 cumene, 2.4 para diisopropyl benzene, 2.5 meta diisopropyl benzene and 2.1 ortho diiospropyl benzene. If the alkylatable aromatic hydrocarbon serves merely as diluent in suppressing the formation of polyalkylated aromatic hydrocarbons in the present process, the results of this run would have been comparable to the results obtained in Example I. But since the results are not comparable it is obvious that the alkylatable aromatic in the reaction mixture must be within the defined limits and cannot be replaced with an equivalent amount of inert solvent. Note that the total percent of benzene and cyclohexane in the reaction mixture was 25.0 percent, which is in excess of the amount of alkylatable aromatic which must be present in the final reaction mixture in accordance with the process of this invention. And yet the amount of polyalkylated aromatic hydrocarbons obtained came to 7.0 percent by volume of the reaction mixture, far in excess of that obtained when the instant process is carried out in accordance with the dictates of this invention. Note, too, 2.1 percent by volume of ortho diisopropyl benzene was also formed.

Obviously many modifications and variations of the invention as hereinabove set forth can be made without departing from the spirit and scope thereof, and therefore only such limitations should be imposed as are indicated in the appended claims.

I claim:

1. A process for alkylating an alkylatable aromatic which comprises reacting said alkylatable aromatic with an olefin in the presence of a $BF_3 \cdot nH_2O$ catalyst, wherein $n$ has a value from about 0.5 to about 2.5, and terminating said reaction when the major amount of said alkylatable aromatic has been reacted but the amount of unreacted alkylatable aromatic remaining is at least about 17 percent by volume of the organic reaction mixture and prior to the formation of appreciable amounts of the ortho dialkylated aromatic formed by the introduction of a second alkyl group ortho to the first alkyl group introduced on said alkylatable aromatic, the product obtained comprising primarily a mono alkylated aromatic and appreciable amounts of dialkylated aromatic.

2. A process for alkylating benzene which comprises reacting benzene with an olefin in the presence of a $BF_3 \cdot nH_2O$ catalyst, wherein $n$ has a value from about 0.5 to about 2.5, and terminating said reaction when the major amount of said benzene has been reacted but the amount of unreacted benzene remaining is at least about 17 percent by volume of the organic reaction mixture and prior to the formation of appreciable amounts of ortho dialkylated benzene, the product obtained comprising primarily a mono alkylated benzene and appreciable amounts of a dialkylated benzene.

3. A process for alkylating an alkylatable aromatic which comprises reacting said alkylatable aromatic with propylene in the presence of a $BF_3 \cdot nH_2O$ catalyst, wherein $n$ has a value from about 0.5 to about 2.5, and terminating said reaction when the major amount of said alkylatable aromatic has been reacted but the amount of unreacted alkylatable aromatic remaining is at least about 17 percent by volume of the organic reaction mixture and prior to the formation of appreciable amounts of the ortho dialkylated aromatic formed by the introduction of a second alkyl group ortho to the first alkyl group introduced on said alkylatable aromatic, the product obtained comprising primarily a mono alkylated aromatic and appreciable amounts of dialkylated aromatic.

4. A process for alkylating benzene which comprises reacting benzene with propylene in the presence of a $BF_3 \cdot nH_2O$ catalyst, where $n$ has a value from about 0.5 to about 2.5, and terminating said reaction when the major amount of said benzene has been reacted but the amount of unreacted benzene remaining is at least about 17 percent by volume of the organic reaction mixture and prior to the formation of appreciable amounts of ortho diisopropyl benzene, the product obtained comprising primarily cumene and appreciable amounts of diisopropyl benzene.

References Cited in the file of this patent
UNITED STATES PATENTS 2,376,119     Bruner et al. _____ May 15, 1955

UNITED STATES PATENT OFFICE
CERTIFICATE OF CORRECTION

Patent No. 3,046,315

July 24, 1962

Harold L. Dimond

It is hereby certified that error appears in the above numbered patent requiring correction and that the said Letters Patent should read as corrected below.

Column 1, line 71, for "0.81:0" read -- 0.8:1.0 --.

Signed and sealed this 13th day of November 1962.

(SEAL)
Attest:

NEST W. SWIDER
testing Officer

DAVID L. LADD
Commissioner of Patents